(12) United States Patent
Cunningham et al.

(10) Patent No.: US 11,687,923 B2
(45) Date of Patent: *Jun. 27, 2023

(54) SYSTEMS AND METHODS FOR FACILITATING TOKENIZATION OF MODIFIABLE GAME ASSETS ON A DISTRIBUTED BLOCKCHAIN

(71) Applicant: Mythical, Inc., Sherman Oaks, CA (US)

(72) Inventors: Stephan Cunningham, Pasadena, CA (US); John Linden, Sherman Oaks, CA (US); Cameron Thacker, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 541 days.

This patent is subject to a terminal disclaimer.

(21) Appl. No.: 16/888,205

(22) Filed: May 29, 2020

(65) Prior Publication Data
US 2020/0293633 A1    Sep. 17, 2020

Related U.S. Application Data

(63) Continuation of application No. 16/154,551, filed on Oct. 8, 2018, now Pat. No. 10,726,107.

(51) Int. Cl.
*G06Q 20/38* (2012.01)
*G06F 21/10* (2013.01)
(Continued)

(52) U.S. Cl.
CPC ....... *G06Q 20/3829* (2013.01); *G06F 21/105* (2013.01); *G06Q 20/065* (2013.01);
(Continued)

(58) Field of Classification Search
CPC .............................................. G06F 21/10–128
See application file for complete search history.

(56) References Cited

U.S. PATENT DOCUMENTS 9,501,791 B2    11/2016    Dziuk
10,102,526 B1    10/2018    Madisetti
(Continued)

OTHER PUBLICATIONS

William Entriken, Dieter Shirley, Jacob Evans, and Nastassia Sachs, EIP-721: ERC-721 Non-Fungible Token Standard, Jan. 24, 2018, available at https://eips.ethereum.org/EIPS/eip-721. (Year: 2018) (15 pages).

(Continued)

*Primary Examiner* — Neha Patel
*Assistant Examiner* — Jeffrey L Licitra
(74) *Attorney, Agent, or Firm* — Esplin & Associates, PC

(57) ABSTRACT

Systems and methods for facilitating tokenization of modifiable game assets on a distributed blockchain may: generate a smart contract configured to contain license keys associated with the modifiable game assets and to effectuate transfers of the license keys to purchasers; post the smart contract to a distributed blockchain; receive sales information describing a first game asset that is usable within the online gaming platform and intended to be offered for sale to gaming users of the online gaming platform; obtain verification information that indicates the first game asset has passed or failed a verification; tokenize the first game asset into a tokenized game asset on the distributed blockchain, responsive to the verification passing successfully; and offer the tokenized game asset for sale.

18 Claims, 3 Drawing Sheets

(51) Int. Cl.
  *G06Q 20/12* (2012.01)
  *G07F 17/32* (2006.01)
  *G06Q 20/06* (2012.01)
  *H04L 9/06* (2006.01)
  *H04L 9/00* (2022.01)

(52) U.S. Cl.
  CPC ..... *G06Q 20/1235* (2013.01); *G07F 17/3281* (2013.01); *A63F 2300/575* (2013.01); *G06Q 2220/00* (2013.01); *H04L 9/0637* (2013.01); *H04L 9/0643* (2013.01); *H04L 9/50* (2022.05)

(56) References Cited

U.S. PATENT DOCUMENTS

| | | | |
|---|---|---|---|
| 10,158,479 | B2 | 12/2018 | Chapman |
| 10,171,509 | B2 | 1/2019 | Anderson |
| 10,269,009 | B1 | 4/2019 | Winklevoss |
| 10,518,178 | B1 | 12/2019 | Cunningham |
| 10,765,948 | B2 * | 9/2020 | Eatedali ............... A63F 13/69 |
| 10,832,247 | B2 * | 11/2020 | Durvasula ............ G06Q 20/389 |
| 10,946,283 | B1 | 3/2021 | Meilich |
| 10,984,400 | B1 | 4/2021 | Koch |
| 11,044,098 | B1 | 6/2021 | Thacker |
| 11,062,284 | B1 | 7/2021 | Cunningham |
| 11,373,174 | B1 | 6/2022 | Cunningham |
| 11,514,417 | B2 | 11/2022 | Thacker |
| 2006/0234795 | A1 | 10/2006 | Dhunjishaw |
| 2008/0046222 | A1 | 2/2008 | Van Luchene |
| 2008/0243697 | A1 | 10/2008 | Irving |
| 2009/0076925 | A1 | 3/2009 | DeWitt |
| 2010/0161837 | A1 * | 6/2010 | Miyajima .......... H04N 1/00973 710/8 |
| 2011/0145602 | A1 | 6/2011 | Ginter |
| 2013/0254125 | A1 | 9/2013 | Sanders |
| 2013/0347100 | A1 | 12/2013 | Tsukamoto |
| 2014/0025563 | A1 | 1/2014 | Bennett |
| 2015/0046590 | A1 | 2/2015 | Laubner |
| 2015/0235039 | A1 | 8/2015 | Yoshinari |
| 2017/0098291 | A1 | 4/2017 | Code |
| 2018/0096752 | A1 * | 4/2018 | Ovalle .................... H04W 4/60 |
| 2018/0114403 | A1 | 4/2018 | Jayachandran |
| 2019/0080407 | A1 | 3/2019 | Molinari |
| 2019/0108576 | A1 | 4/2019 | Laprade |
| 2020/0027067 | A1 | 1/2020 | Hertzog |
| 2020/0042989 | A1 | 2/2020 | Ramadoss |
| 2020/0110855 | A1 | 4/2020 | Cunningham |
| 2020/0179810 | A1 | 6/2020 | Cunningham |
| 2021/0073881 | A1 | 3/2021 | Stoddard |

OTHER PUBLICATIONS

Ron White, How Computers Work, Oct. 15, 2003, Que Publishing, 7th Ed, p. 4. (Year: 2003).

* cited by examiner

SYSTEMS AND METHODS FOR FACILITATING TOKENIZATION OF MODIFIABLE GAME ASSETS ON A DISTRIBUTED BLOCKCHAIN

FIELD OF THE DISCLOSURE

The present disclosure relates to systems and methods for facilitating tokenization of modifiable game assets on a distributed blockchain.

BACKGROUND

Distributed ledgers are known techniques to produce a secure record or registry of ownership of assets, transactions, and other information. For example, a distributed blockchain is a distributed ledger. Blockchain technology is known, e.g., as used for cryptocurrencies, smart contracts, and other applications for a decentralized database. Tokenization of (digital) objects and/or assets on a distributed blockchain is known, e.g., as used for security tokens, utility tokens, and payment tokens.

SUMMARY

One aspect of the present disclosure relates to a system configured for facilitating tokenization of modifiable game assets on a distributed blockchain. The system may include one or more hardware processors configured by machine-readable instructions. The processor(s) may be configured to generate a smart contract configured to contain license keys associated with the modifiable game assets and to effectuate transfers of the license keys to purchasers and/or donees of the license keys. The modifiable game assets may be usable within an online gaming platform. The license keys may confer to the purchasers and/or donees limited rights to offer game assets for sale or distribution in the online gaming platform. In some implementations, the license keys may confer to the purchasers and/or donees ownership rights in game assets based on the modifiable game assets. The game assets offered for sale or distribution may be modified versions of the modifiable game assets. The game assets may be usable within an online gaming platform. The processor(s) may be configured to post the smart contract to a distributed blockchain. The distributed blockchain may be maintained by a distributed computing platform. The distributed computing platform may be different and separate from the system configured for facilitating tokenization of modifiable game assets on the distributed blockchain. The processor(s) may be configured to receive sales information describing a first game asset that is usable within the online gaming platform and intended to be offered for sale or distribution, e.g., to gaming users of the online gaming platform. The first game asset may be a modified version of one of the modifiable game assets. The sales information may include a particular license key. The processor(s) may be configured to obtain verification information that indicates the first game asset has passed or failed a verification. The verification may include, by way of non-limiting example, whether the particular license key matches a license key that has been transferred to one of the purchasers and/or donees. The processor(s) may be configured to tokenize the first game asset into a tokenized game asset on the distributed blockchain, responsive to the verification passing successfully. The processor(s) may be configured to offer the tokenized game asset for sale or distribution, e.g., to gaming users of the online gaming platform.

Another aspect of the present disclosure relates to a method for facilitating tokenization of modifiable game assets on a distributed blockchain. The method may include generating a smart contract configured to contain license keys associated with the modifiable game assets and to effectuate transfers of the license keys to purchasers and/or donees of the license keys. The modifiable game assets may be usable within an online gaming platform. The license keys may confer to the purchasers and/or donees limited rights to offer game assets for sale in the online gaming platform. In some implementations, the license keys may confer to the purchasers and/or donees ownership rights in game assets based on the modifiable game assets. The game assets offered for sale may be modified versions of the modifiable game assets. The method may include posting the smart contract to a distributed blockchain. The distributed blockchain may be maintained by a distributed computing platform. The method may include receiving sales information describing a first game asset that is usable within the online gaming platform and intended to be offered for sale or distribution, e.g., to gaming users of the online gaming platform. The first game asset may be a modified version of one of the modifiable game assets. The sales information may include a particular license key. The method may include obtaining verification information that indicates the first game asset has passed or failed a verification. The verification may include, by way of non-limiting example, whether the particular license key matches a license key that has been transferred to one of the purchasers and/or donees. The method may include tokenizing the first game asset into a tokenized game asset on the distributed blockchain, responsive to the verification passing successfully. The method may include offering the tokenized game asset for sale or distribution, e.g., to gaming users of the online gaming platform.

As used herein, any association (or relation, or reflection, or indication, or correspondency) involving servers, processors, client computing platforms, smart contracts, license keys, game assets, purchasers, donees, verifications, users, participants, donations, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
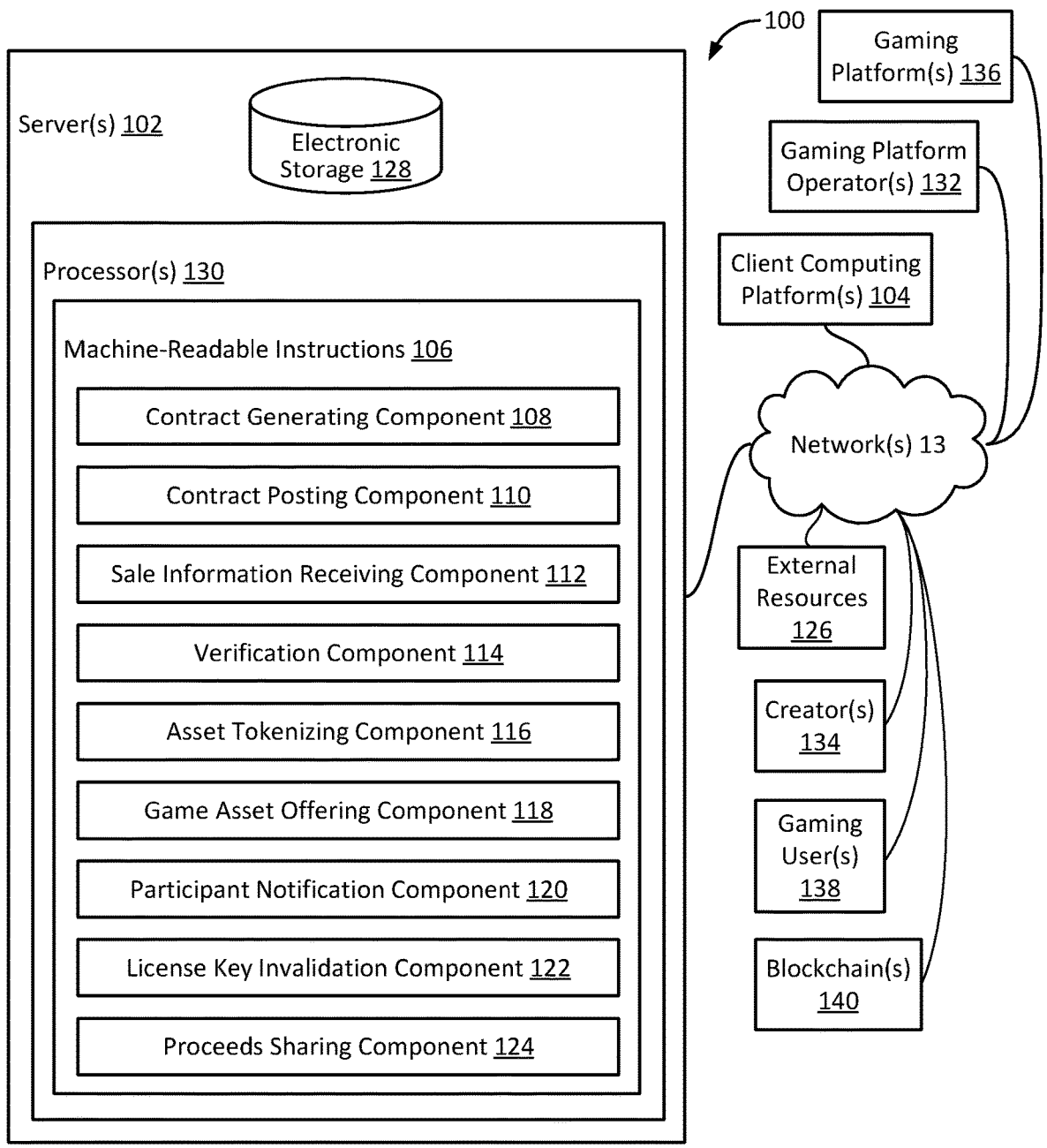
FIG. 1 shows a system configured for facilitating tokenization of modifiable game assets on a distributed blockchain, in accordance with one or more implementations.

FIG. 1 illustrates a system 100 configured for facilitating tokenization of modifiable game assets on a distributed blockchain, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

In some implementations, system 100 and/or servers 102 may be configured to communicate with one or more of (online) gaming platform(s) 136, gaming platform operator(s) 132, creator(s) 134, gaming user(s) 138, blockchain(s) 140, and/or other components and/or users.

In some implementations, a distributed blockchain may be maintained by a distributed computing platform. In some implementations, the distributed computing platform may be implemented by a set of client computing platforms and/or servers. The distributed computing platform may support a virtual machine. The distributed computing platform and/or the virtual machine may form a runtime environment for smart contracts. In some implementations, the distributed computing platform may include storage configured to store the blockchain. The smart contracts may be stored on the blockchain. In some implementations, the distributed computing platform may be Ethereum. In some implementations, the virtual machine may be a Turing-complete and decentralized virtual machine.

The distributed blockchain may act as a decentralized database that stores a registry of assets and transactions across one or more networks. A given asset may be owned by a particular user. The asset may include anything of material value or usefulness that is owned by a person or company, according to some implementations. In some implementations, the distributed blockchain may record ownership of assets and/or transactions that modify ownership of assets. A smart contract is a type of asset. In some implementations, once a smart contract has been added to the distributed blockchain, the smart contract may be referred to as published and/or posted. Elements of the distributed blockchain may be grouped together in units that are referred to as blocks. For example, an individual block may include one or more assets and one or more transactions.

The distributed blockchain may be publicly accessible and append-only. In some implementations, existing blocks of the distributed blockchain can substantially not be altered or deleted, unless multiple copies of the distributed blockchain are altered. This is unlikely to happen provided that multiple copies of the distributed blockchain are stored on different computing platforms, e.g., in different geographical locations. The distributed blockchain may be replicated on multiple computing platforms, preferably in multiple different geographical locations.

Server(s) 102 may be configured by machine-readable instructions 106. Machine-readable instructions 106 may include one or more instruction components. The instruction components may include computer program components. The instruction components may include one or more of a contract generating component 108, a contract posting component 110, a sale information receiving component 112, a verification component 114, an asset tokenizing component 116, a game asset offering component 118, a participant notification component 120, a license key invalidation component 122, a proceeds sharing component 124, and/or other instruction components.

Contract generating component 108 may be configured to generate smart contracts. In some implementations, a smart contract may be configured to contain license keys associated with the modifiable game assets. In some implementations, individual license keys may be associated with individual modifiable game assets. In some implementations, the license keys, upon purchase by creators 134 and/or other purchasers through the smart contract, may confer limited rights to the purchasers. In some implementations, the license keys may be free, or may be donated to creators 134, and may confer limited rights to creators 134. Receivers of donations and/or other gifts may be referred to as donees.

The limited rights may define limitations to the types of usage that are allowed within system 100 and/or gaming platform 136. In some implementations, the license keys may confer to the purchasers and/or donees limited rights to offer game assets (for sale, distribution, and/or otherwise offered to gaming users 138) in gaming platform 136, e.g., to gaming users 138 of gaming platform 136. In some implementations, the purchasers and/or donees may have the right to maintain ownership of the game assets, without a requirement to offer the game assets for sale.

The game assets may be (collections and/or packages of) virtual objects that are usable within gaming platform 136. In some implementations, a game asset may be a level, mission, assignment, chapter, task, mini-game, and/or other package of content that is usable within gaming platform 136. The game assets offered to gaming users 138 may be modified versions of the modifiable game assets. For example, a game asset may be modified by creator 134. In some implementations, modifications may be made within gaming platform 136. In some implementations, modifications may be made using tools and/or services external to system 100. In some implementations, license keys may be donated and/or sold by and/or on behalf of gaming platform operators 132. After modification of a game asset, creator 134 may offer the game asset in gaming platform 136 and/or in another platform that supports the distribution of game assets, including but not limited to the sale of the game assets.

As used herein, gaming platform 136 may refer to either an individual game, a type of gaming console and its ecosystem, and/or both. Gaming platform operator 132 may refer to a host, operator, owner, and/or other stakeholder of gaming platform 136. Gaming users 138 may refer to players that play on gaming platform 136.

In some implementations, a smart contract may be configured to effectuate transfers of the license keys (or rights related to the license keys) to creators 134, donees, and/or purchasers. In some implementations, the purchasers may purchase the license keys, e.g., by transferring amounts of a currency, e.g., a virtual currency. In some implementations, the donees may receive the license keys for free. For example, the license keys may confer to the purchasers and/or donees ownership rights in game assets based on the modifiable game assets, without a requirement to offer the game assets for sale. The smart contract may be configured to effectuate transfers of the license keys (or rights related to the license keys) to creators 134 and/or the purchasers, e.g., subsequent to receiving the amounts of the virtual currency or receiving some other consideration. For example, a smart contract may effectuate a transfer of a first license key to a first participant, e.g., upon purchase by the first participant. In some implementations, the first participant may be one of creators 134. In some implementations, the smart contract may receive a unique identifier from an individual creator 134, e.g., during the purchase by the individual creator 134. The individual creator 134 may also be referred to as the first participant. In some implementations, the unique identifier may identify the purchaser, e.g., the first participant. For example, in some types of blockchains, a unique identifier may be a (blockchain) address and/or an account identifier. In some implementations, a smart contract may contain a limited number of license keys. In some implementations, a particular license key may be associated with a particular modifiable game asset such that the number of license keys available for purchase (or donation) is reduced upon every purchase (or donation).

The modifiable game assets may be usable within an online gaming platform, e.g. gaming platform 136. In some implementations, a game asset may need to be verified after being modified by creator 134, and prior to being used and/or offered for sale or distribution. This process may be referred to as "checking in." Gaming platform 136 and/or gaming platform operator 132 may enforce rules and/or guidelines for the use, sale, and/or distribution of game assets on gaming platform 136. The verification of a game asset that is based on a modifiable game asset may include, by way of non-limiting example, checking the game asset against such rules and/or guidelines. For example, rules may be enforced to prevent obscene depictions, inappropriate content, outlandish (destructive) power, and/or other characteristics of a game asset. In some implementations, game assets can only be offered for sale or distribution subsequent to successful verification. In some implementations, checking in a modified game asset may be supported within gaming platform 136. In some implementations, checking in a modifiable game asset may use tools and/or services external to system 100.

In some implementations, the limited rights conferred by a license key may include one or more of an expiration date and time after which the game assets can no longer be successfully verified in order to be offered for sale or distribution. Conformation to the limited rights may include an expiration check that either passes or fails based on the expiration date and time.

In some implementations, the limited rights conferred by a license key may include limitations on the sales price of a game asset, such as, e.g., a minimum price, a maximum price, and/or other limitations based on a price of the game asset. In some implementations, the limited rights conferred by a license key may include limitations on the conditions for the distribution of a game asset.

Contract posting component 110 may be configured to post the smart contract to a distributed blockchain, e.g., blockchain 140. Blockchain 140 may be maintained by a distributed computing platform. The distributed computing platform may be different and separate from system 100. The distributed computing platform may form a runtime environment for smart contracts.

Figure 3:
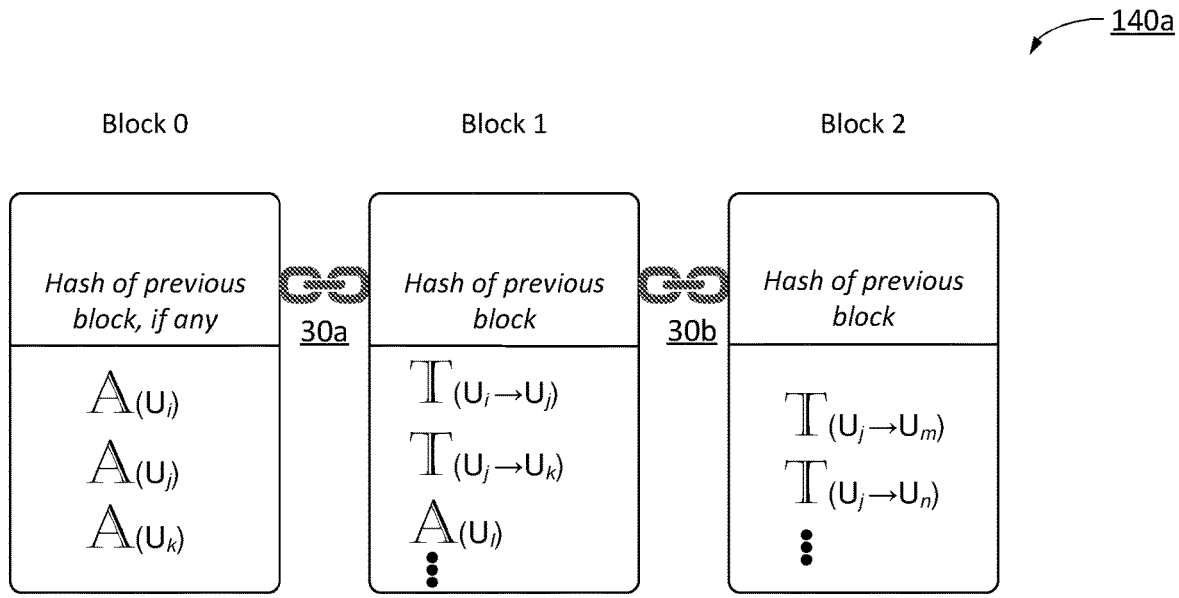
FIGS. 3 and 4 illustrate exemplary distributed blockchains, in accordance with use by one or more implementations.

By way of non-limiting example, FIG. 3 illustrates a blockchain 140*a* that includes a block 0, a block 1, and a block 2. As time progresses, more blocks may be added to blockchain 140*a*. The blocks within blockchain 140*a* are ordered. In block 0, three assets (indicated by a capital "A") are generated and/or assigned to three users or participants: a first asset is assigned to user i ($U_i$), a second asset is assigned to user j ($U_j$), and a third asset is assigned to user k ($U_k$). Block 1 is connected to block 0 (as indicated by a link 30*a*), for example by including an address of block 1 in block 0, or vice versa. Likewise, block 1 is connected to block 2, as indicated by a link 30*b*.

In block 1, one asset is generated and/or assigned to user l ($U_l$). Additionally, block 1 includes two transactions (indicated by a capital "T"): a first transaction from user i to user j, and a second transaction from user j to user k. Block 2 includes a first transaction from user j to user m, and a second transaction from user j to user n. In some implementations, based on the contents of the blocks, any user of blockchain 140*a* may determine the current assets of blockchain 140*a*, and the balances of any user. In some implementations, the balance of a particular user may be verified prior to adding a transaction that reduces that particular user's balance. For example, an individual user may not be allowed to transfer more assets than the individual user owns.

Figure 4:
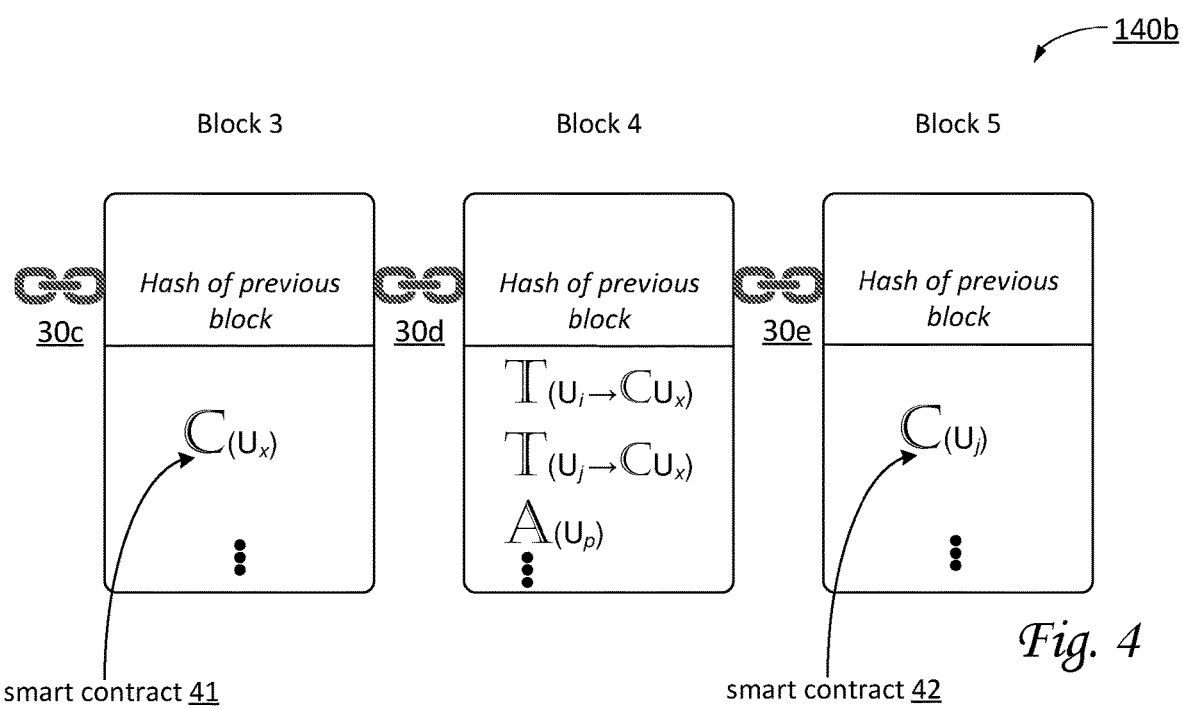

By way of non-limiting example, FIG. 4 illustrates a blockchain 140*b* that includes the same blocks as blockchain 140*a* of FIG. 3, plus additional blocks (block 3, block 4, block 5) that have been appended to the blockchain. Block 3 may be connected to block 2 (as indicated by a link 30*c*). In block 3, a smart contract 41 (indicated by a capital "C") is posted. For example, smart contract 41 may have been generated by a component similar to contract generating component 108, and may have been posted to blockchain 140*b* by a component similar to contract posting component 110 (both shown in FIG. 1). Referring to FIG. 4, for example, user x ($U_x$) may be the user offering license keys to modifiable game assets for sale through smart contract 41, e.g., for a particular modifiable game asset. For example, user x may be a gaming platform operator similar to gaming platform operator 132 in FIG. 1. In some implementations, a smart contract may be appended to a distributed blockchain as soon as at least one participant of the smart contract is known. In some implementations, a smart contract may be appended to a distributed blockchain as soon as both participants are known and/or agreed upon. In block 4, one asset is generated and/or assigned to user p ($U_p$). Additionally, block 4 includes two transactions (indicated by a capital "T"): a first transaction from user i to user x and/or smart contract 41, and a second transaction from user j to user x and/or smart contract 41. For example, the first transaction may represent a purchase of a first license key by user i, and the second transaction may represent a purchase of a second license key by user j. These users may be creators, and may intend to sell one or more game assets based on the modifiable game assets for which they have purchased license keys through the transactions in block 4.

Referring to FIG. 1, sale information receiving component 112 may be configured to receive sales information and/or other information. In some implementations, sales information may describe characteristics, definitions, prices, seller identity, and/or other information regarding game assets. Sales information may need to be verified before the corresponding game asset may be offered for sale or distribution. For example, sales information may describe a first game asset that is usable within gaming platform 136. In some implementations, sales information may describe a game asset that is intended to be offered for sale or distribution to users of an online gaming platform, such as gaming users 138 of gaming platform 136. The first game asset may be a modified version of one of the modifiable game assets. The sales information may include a particular license key. For example, the particular license key may be used to verify whether the user who wants to sell or distribute the first game asset has previously obtained the right to do so. For example, each license key may be paired with a unique identifier that identifies an individual creator 134. In some implementations, only the creator who purchased a license key will be allowed to offer a game asset for sale. In some implementations, responsive to the verification information indicating the first game asset has passed the verification successfully, the particular license key may be invalidated, thereby prevent subsequent reuse of the same particular license key.

For example, sale information receiving component 112 may be configured to receive particular sales information from a particular creator 134 who has previously purchased a particular license key associated with a particular modifiable game asset. The particular creator 134 may have produced a new game asset based on modifying the particular modifiable game asset. The particular sales information describes the new game asset, and includes the particular license key. For example, user i in FIG. 4 may have produced a first new game asset based on modifying the modifiable game asset associated with the license key purchased in the first transaction in block 4. For example, user j in FIG. 4 may have produced a second new game asset based on modifying the modifiable game asset associated with the license key purchased in the second transaction in block 4. Both user i and user j may have (separately) provided, to sale information receiving component 112, sales information describing the first new game asset and the second new game asset, respectively.

Verification component 114 may be configured to obtain verification information that indicates the first game asset has passed or failed a verification. In some implementations, the verification process may be performed, at least in part, by a third party external to system 100. Alternatively, and/or simultaneously, verification may be performed, at least in part, within system 100. For example, verification may be performed by verification component 114. Verification may include one or more of the following: whether the particular license key is valid (e.g., previously unused, and/or previously sold), whether the sales information for the first game asset conforms to the limited rights conferred (e.g., having a sales price above the minimum price, or being offered for sale or distribution prior to an expiration date), whether the modified game asset meets the rules and/or guidelines for sale, usage, and/or distribution, and/or meets the rules and/or guidelines for other types of verification. The verification may include whether the sales information has been received from the first participant. The verification may include whether the particular license key matches a license key that has been transferred to one of the purchasers and/or donees, or, e.g., specifically to the purchaser of the particular license key. A verification of the expiration date and/or time may be referred to as an expiration check.

For example, verification component 114 may be configured to obtain verification information regarding the verification of the first new game asset and the second new game asset produced by user i and user j in FIG. 4. For example, the verification of the first new game asset may have failed, and the verification of the second new game asset may have passed. Accordingly, the second new game asset may be tokenized and offered for sale or distribution on the distributed blockchain (e.g., blockchain 140b in FIG. 4). The first new game asset may not be tokenized and may not be offered for sale or distribution on the distributed blockchain.

Referring to FIG. 1, asset tokenizing component 116 may be configured to tokenize assets for use, sale, distribution, and/or transfer on a blockchain, e.g., blockchain 140. Asset tokenization component 116 may be configured to perform tokenization of digital objects and/or assets. For example, the first game asset may be tokenized into a tokenized game asset on a distributed blockchain, e.g., blockchain 140. In some implementations, tokenization of a particular asset may be responsive to the verification of that asset passing successfully. The tokenized game asset may be offered for sale or distribution, e.g., to gaming users of online gaming platform 136. For example, the tokenized game asset may be offered for sale or distribution on blockchain 140 through a separate smart contract. In some implementations, the tokenized game asset may be offered for sale or distribution on blockchain 140 even though the particular game asset can not be used on blockchain 140, but on gaming platform 136.

Game asset offering component 118 may be configured to offer assets, including game assets, for sale or distribution. In some implementations, game asset offering component 118 may be configured to offer assets for sale or distribution to users of blockchain 140. For example, the tokenized game asset may be offered for sale or distribution on blockchain 140 through a separate smart contract. Alternatively, and/or simultaneously, in some implementations, game asset offering component 118 may be configured to offer assets for sale or distribution to gaming users 138 of gaming platform 136. In some implementations, game asset offering component 118 may be configured to offer a tokenized game asset for sale or distribution.

By way of non-limiting example, FIG. 4 illustrates blockchain 140b. Block 5 may be connected to block 4 (as indicated by a link 30e). In block 5, a smart contract 42 (indicated by a capital "C") is posted. For example, smart contract 42 may have been generated and posted on behalf of user j. Smart contract 42 may offer for sale the (tokenized) second new game asset, subsequent to the second new game asset passing verification (which may be indicated by verification component 114) and being tokenized. For example, the first new game asset produced by user i may not be offered for sale until the first new game asset passed verification.

Referring to FIG. 1, participant notification component 120 may be configured to notify users, e.g. creators 134. In some implementations, participant notification component 120 may be configured to notify the particular participant who provided the sales information to sale information receiving component 112, such as user j in FIG. 4. In some implementations, notifications may be responsive to the verification information (e.g., from verification component 114) indicating a particular game asset has passed (such as user j in FIG. 4) or failed the verification (such as user i in FIG. 4). In some implementations, notifications may be responsive to the verification information (e.g., from verification component 114) indicating a particular game asset has failed the verification and has passed an expiration check (of the expiration date) successfully. In some implementations, notifications may be responsive to the verification information (e.g., from verification component 114) indicating a particular game asset has failed the verification and that a particular game asset is not offered for sale or distribution to users of gaming platform 136 unless a subsequent attempt at verification passes successfully. In some implementations, participant notification component 120 may be configured to notify a user that the verification has failed permanently and that a particular game asset will be not offered for sale or distribution, e.g., to users of gaming platform 136.

License key invalidation component 122 may be configured to invalidate a particular license key. For example, a particular license key may be invalidated responsive to the verification information indicating the corresponding game asset has failed the verification and has failed an expiration check. For example, a particular license key may be invalidated once a particular game asset has been offered for sale or distribution, e.g., to prevent subsequent reuse of the same particular license key. In some implementations, a particular license key may be invalidated once a particular game asset has been verified successfully, e.g., to prevent subsequent reuse of the same particular license key.

Proceeds sharing component 124 may be configured to share and/or transfer proceeds of sales or other distributions of game assets. For example, proceeds sharing component 124 may be configured to share at least a portion of proceeds from a sale of a particular tokenized game asset. In some implementations, proceeds may be shared subsequent to a sale. In some implementations, proceeds may be shared with a particular participant, e.g., the creator of the modified and/or tokenized game asset. For example, referring to FIG. 4, user j may receive at least a portion of the proceeds of the sale of the second new game asset through smart contract 42.

Referring to FIG. 1, in some implementations, server(s) 102, client computing platform(s) 104, and/or external resources 126 may be operatively linked via one or more electronic communication links. For example, such electronic communication links may be established, at least in part, via one or more networks 13 such as, e.g., the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with network 13 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116, 118, 120, 122, and/or 124, and/or other components. Processor(s) 130 may be configured to execute components 108, 110, 112, 114, 116, 118, 120, 122, and/or 124, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, and/or 124 are illustrated in FIG. 1 as being implemented within a single processing unit, in implementations in which processor(s) 130 includes multiple processing units, one or more of components 108, 110, 112, 114, 116, 118, 120, 122, and/or 124 may be implemented remotely from the other components. The description of the functionality provided by the different components 108, 110, 112, 114, 116, 118, 120, 122, and/or 124 described below is for illustrative purposes, and is not intended to be limiting, as any of components 108, 110, 112, 114, 116, 118, 120, 122, and/or 124 may provide more or less functionality than is described. For example, one or more of components 108, 110, 112, 114, 116, 118, 120, 122, and/or 124 may be eliminated, and some or all of its functionality may be provided by other ones of components 108, 110, 112, 114, 116, 118, 120, 122, and/or 124. As another example, processor(s) 130 may be configured to execute one or more additional components that may perform some or all of the functionality attributed below to one of components 108, 110, 112, 114, 116, 118, 120, 122, and/or 124.

Figure 2:
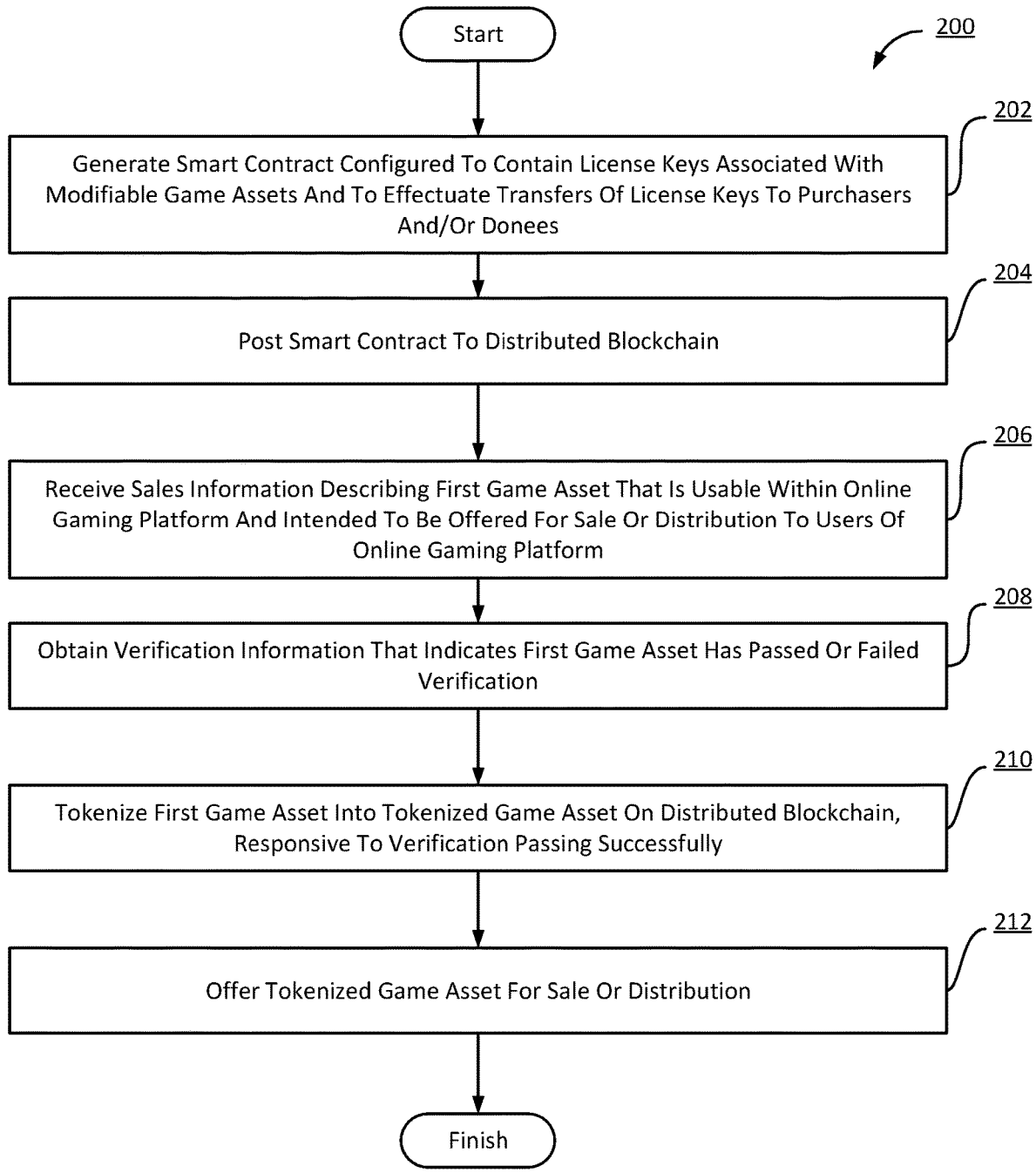
FIG. 2 includes a flow chart of a method for facilitating tokenization of modifiable game assets on a distributed blockchain, in accordance with one or more implementations.

FIG. 2 illustrates a method 200 for facilitating tokenization of modifiable game assets on a distributed blockchain, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include generating a smart contract configured to contain license keys associated with the modifiable game assets and to effectuate transfers of the license keys to purchasers (or donees). The modifiable game assets may be usable within an online gaming platform. The license keys may confer to the purchasers limited rights to offer game assets for sale or distribution in the online gaming platform. The game assets offered for sale or distribution may be modified versions of the modifiable game assets. Operation 202 may be performed by one or more hardware processors configured by machine-readable instructions including a component that is the same as or similar to contract generating component 108, in accordance with one or more implementations.

An operation 204 may include posting the smart contract to a distributed blockchain. The distributed blockchain may be maintained by a distributed computing platform. Operation 204 may be performed by one or more hardware processors configured by machine-readable instructions including a component that is the same as or similar to contract posting component 110, in accordance with one or more implementations.

An operation 206 may include receiving sales information describing a first game asset that is usable within the online gaming platform and intended to be offered for sale or distribution, e.g., to (gaming) users of the online gaming platform. The first game asset may be a modified version of one of the modifiable game assets. The sales information may include a particular license key. Operation 206 may be performed by one or more hardware processors configured by machine-readable instructions including a component that is the same as or similar to sale information receiving component 112, in accordance with one or more implementations.

An operation 208 may include obtaining verification information that indicates the first game asset has passed or failed a verification. The verification may include whether the particular license key matches a license key that has been transferred to one of the purchasers. Operation 208 may be performed by one or more hardware processors configured by machine-readable instructions including a component that is the same as or similar to verification component 114, in accordance with one or more implementations.

An operation 210 may include tokenizing the first game asset into a tokenized game asset on the distributed blockchain, responsive to the verification passing successfully. Operation 210 may be performed by one or more hardware processors configured by machine-readable instructions including a component that is the same as or similar to asset tokenizing component 116, in accordance with one or more implementations.

An operation 212 may include offering the tokenized game asset for sale (or distribution). Operation 212 may be performed by one or more hardware processors configured by machine-readable instructions including a component that is the same as or similar to game asset offering component 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for facilitating tokenization of modified versions of modifiable game assets on a distributed blockchain, wherein the modifiable game assets are in-game virtual items that are usable within an online game on an online gaming platform, the system comprising:
one or more hardware processors configured by machine-readable instructions to:
generate a smart contract configured to contain license keys associated with the modifiable game assets and to effectuate transfers of the license keys to purchasers, wherein the modifiable game assets are in-game virtual items that are usable within the online game on the online gaming platform, wherein the purchasers are users of the online gaming platform, wherein the license keys confer to the purchasers limited rights to:
(i) modify the modifiable game assets into modified versions of the modifiable game assets, and
(ii) offer game assets for sale to gaming users of the online gaming platform, wherein the game assets offered for sale are usable within the online game, wherein the game assets offered for sale are the modified versions of the modifiable game assets;
record the smart contract on a distributed blockchain, wherein the distributed blockchain is maintained by a distributed computing platform, wherein the smart contract effectuates a transfer of a first license key to a first license key purchaser upon purchase of the first license key by the first license key purchaser, wherein the first license key is associated with a first modifiable game asset that can be modified into a first modified version of the first modifiable game asset, wherein the first license key confers limited rights to make an offer for sale of the first modified version of the first modifiable game asset;

receive sales information describing a first game asset that is usable within the online game on the online gaming platform and intended to be offered for sale to the gaming users of the online gaming platform, wherein the first game asset is the modified version of the first modifiable game asset that has undergone one or more modifications, and wherein the sales information includes a particular license key;

obtain verification information that indicates the first game asset has passed or failed a verification, wherein performance of the verification includes verifying whether the particular license key matches the first license key;

tokenize the first game asset into a tokenized game asset on the distributed blockchain, subsequent to the verification passing successfully, such that ownership rights pertaining to the tokenized game asset are recorded on the distributed blockchain;

offer the tokenized game asset for sale to the gaming users of the online gaming platform;

effectuate a first sale of the tokenized game asset to a first gaming user; and use, by the first gaming user, the tokenized game asset within the online game on the online gaming platform.

2. The system of claim 1, wherein the license keys confer to the purchasers the limited rights such that the offers for sale are contingent on occurrence prior to expiration dates, wherein the first license key confers the limited rights such that the offer for sale is contingent on occurrence prior to a first expiration date, and wherein the performance of the verification further includes verifying whether the first expiration date has expired.

3. The system of claim 1, wherein the purchasers purchase the license keys by transferring amounts of a virtual currency, wherein the smart contract is configured to effectuate transfers of the license keys to the purchasers subsequent to receiving the amounts of the virtual currency.

4. The system of claim 1, wherein the purchase of the first license key reduces a number of license keys available for purchase.

5. The system of claim 4, wherein the smart contract receives a unique identifier during the purchase by the first license key purchaser, wherein the unique identifier identifies the first license key purchaser.

6. The system of claim 2, wherein the one or more hardware processors are further configured by machine-readable instructions to:

notify the first license key purchaser, responsive to the verification information indicating the first game asset has failed the verification and the first expiration date has not yet expired, that the verification has failed and that the first game asset is not offered for sale to the gaming users of the online gaming platform unless a subsequent attempt at the verification passes successfully.

7. The system of claim 2, wherein the one or more hardware processors are further configured by machine-readable instructions to:

invalidate the particular license key, responsive to the verification information indicating the first game asset has failed the verification and the first expiration date has expired;

notify the first license key purchaser that the verification has failed permanently and that the first game asset will be not offered for sale to the gaming users of the online gaming platform.

8. The system of claim 1, wherein the verification includes whether the sales information has been received from the first license key purchaser.

9. The system of claim 8, wherein the one or more hardware processors are further configured by machine-readable instructions to:

transfer at least a portion of proceeds from the first sale of the tokenized game asset to the first license key purchaser, responsive to the first sale.

10. A method for facilitating tokenization of modified versions of modifiable game assets on a distributed blockchain, wherein the modifiable game assets are in-game virtual items that are usable within an online game on an online gaming platform, the method comprising:

generating a smart contract configured to contain license keys associated with the modifiable game assets and to effectuate transfers of the license keys to purchasers, wherein the modifiable game assets are in-game virtual items that are usable within the online game on the online gaming platform, wherein the purchasers are users of the online gaming platform, wherein the license keys confer to the purchasers limited rights to:
(i) modify the modifiable game assets into modified versions of the modifiable game assets, and
(ii) offer game assets for sale to gaming users of the online gaming platform, wherein the game assets are usable within the online game, wherein the game assets offered for sale are the modified versions of the modifiable game assets;

recording the smart contract on a distributed blockchain, wherein the distributed blockchain is maintained by a distributed computing platform, wherein the smart contract effectuates a transfer of a first license key to a first license key purchaser upon purchase of the first license key by the first license key purchaser, wherein the first license key is associated with a first modifiable game asset that can be modified into a first modified version of the first modifiable game asset, wherein the first license key confers limited rights to make an offer for sale of the first modified version of the first modifiable game asset;

receiving sales information describing a first game asset that is usable within the online game on the online gaming platform and intended to be offered for sale to the gaming users of the online gaming platform, wherein the first game asset is the modified version of the first modifiable game asset that has undergone one or more modifications, and wherein the sales information includes a particular license key;

obtaining verification information that indicates the first game asset has passed or failed a verification, wherein performance of the verification includes verifying whether the particular license key matches the first license key;

tokenizing the first game asset into a tokenized game asset on the distributed blockchain, subsequent to the verification passing successfully, such that ownership rights pertaining to the tokenized game asset are recorded on the distributed blockchain;

offering the tokenized game asset for sale to the gaming users of the online gaming platform;

effectuating a first sale of the tokenized game asset to a first gaming user; and using, by the first gaming user, the tokenized game asset within the online game on the online gaming platform.

11. The method of claim 10, wherein the license keys confer to the purchasers the limited rights such that the offers for sale are contingent on occurrence prior to expiration dates, wherein the first license key confers the limited rights such that the offer for sale is contingent on occurrence prior to a first expiration date, and wherein the performance of the verification further includes verifying whether the first expiration date has expired.

12. The method of claim 10, wherein the purchasers purchase the license keys by transferring amounts of a virtual currency, wherein the smart contract is configured to effectuate transfers of the license keys to the purchasers subsequent to receiving the amounts of the virtual currency.

13. The method of claim 10, wherein the purchase of the first license key reduces a number of license keys available for purchase.

14. The method of claim 13, wherein the smart contract receives a unique identifier during the purchase by the first license key purchaser, wherein the unique identifier identifies the first license key purchaser.

15. The method of claim 10, further comprising:

notifying the first license key purchaser, responsive to the verification information indicating the first game asset has failed the verification and the first expiration date has not yet expired, that the verification has failed and that the first game asset is not offered for sale to the gaming users of the online gaming platform unless a subsequent attempt at the verification passes successfully.

16. The method of claim 10, further comprising:

invalidating the particular license key, responsive to the verification information indicating the first game asset has failed the verification and the first expiration date has expired; and notifying the first license key purchaser that the verification has failed permanently and that the first game asset will be not offered for sale to the gaming users of the online gaming platform.

17. The method of claim 9, wherein the verification includes whether the sales information has been received from the first license key purchaser.

18. The method of claim 17, further comprising:

transferring at least a portion of proceeds from the first sale of the tokenized game asset to the first license key purchaser, responsive to the first sale.

* * * * *